US012616245B2

(12) United States Patent
Butenkemper et al.

(10) Patent No.: US 12,616,245 B2
(45) Date of Patent: May 5, 2026

(54) HEATING ELEMENT HAVING HEAT CONDUCTIVE AND WICKING FILAMENTS

(71) Applicant: Philip Morris Products S.A., Neuchatel (CH)

(72) Inventors: Stefan Butenkemper, Oelde (DE); Detlef John, Oelde (DE); Ihar Nikolaevich Zinovik, Neuchatel (CH)

(73) Assignee: Philip Morris Products S.A., Neuchatel (CH)

(*) Notice: Subject to any disclaimer, the term of this patent is extended or adjusted under 35 U.S.C. 154(b) by 456 days.

(21) Appl. No.: 17/759,247

(22) PCT Filed: Jan. 27, 2021

(86) PCT No.: PCT/EP2021/051849
§ 371 (c)(1),
(2) Date: Jul. 21, 2022

(87) PCT Pub. No.: WO2021/151935
PCT Pub. Date: Aug. 5, 2021

(65) Prior Publication Data

US 2023/0082650 A1 Mar. 16, 2023

(30) Foreign Application Priority Data

Jan. 28, 2020 (EP) ..................................... 20154181
Sep. 23, 2020 (EP) ..................................... 20197829

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/44* (2020.01); *A24F 40/465* (2020.01);
(Continued)

(58) Field of Classification Search
CPC .......... A24F 40/10; A24F 40/70; A24F 40/46; A24F 40/42; A24F 40/40; A24F 40/20; A24F 40/00
See application file for complete search history.

(56) References Cited

U.S. PATENT DOCUMENTS

2015/0090280 A1 4/2015 Chen
2015/0320116 A1 11/2015 Bleloch et al.
(Continued)

FOREIGN PATENT DOCUMENTS

CN 105072935 A 11/2015
CN 105939625 A 9/2016
(Continued)

OTHER PUBLICATIONS

Combined Russian Notice of Allowance and Search Report issued May 13, 2024 in Russian Patent Application No. 2022120564/07, 10 pages.
(Continued)

*Primary Examiner* — Alex B Efta
(74) *Attorney, Agent, or Firm* — Oblon, McClelland, Maier & Neustadt, L.L.P.

(57) ABSTRACT

A heating element for an aerosol-generating system is provided, the heating element including: a plurality of first filaments; and a plurality of second filaments, in which the plurality of first filaments are configured to heat a liquid aerosol-forming substrate, the plurality of second filaments are configured to convey the liquid aerosol-forming substrate to wet at least a portion of the heating element with the liquid aerosol-forming substrate, and the heating element is arranged to form a mesh, the plurality of first filaments being arranged in a first direction and the plurality of second filaments being arranged in a second direction, and the second direction being transverse to the first direction. A
(Continued)

heater assembly, a cartridge, and a method of manufacturing a heating element, are also provided.

10 Claims, 6 Drawing Sheets

(51) Int. Cl.

| | |
|---|---|
| ***A24F 40/44*** | (2020.01) |
| ***A24F 40/465*** | (2020.01) |
| ***A24F 40/70*** | (2020.01) |
| ***H05B 3/34*** | (2006.01) |
| ***H05B 6/10*** | (2006.01) |
| ***H05B 11/00*** | (2006.01) |

(52) U.S. Cl.

CPC ............... *A24F 40/70* (2020.01); *H05B 3/34* (2013.01); *H05B 6/108* (2013.01); *H05B 11/00* (2013.01); *H05B 2203/021* (2013.01)

(56) References Cited

U.S. PATENT DOCUMENTS

| | | | | |
|---|---|---|---|---|
| 2016/0338410 | A1* | 11/2016 | Batista | A24F 40/70 |
| 2016/0345630 | A1 | 12/2016 | Mironov et al. | |
| 2017/0238611 | A1 | 8/2017 | Buchberger et al. | |
| 2017/0280772 | A1* | 10/2017 | Batista | A24F 40/46 |
| 2017/0340011 | A1* | 11/2017 | Batista | A24F 40/46 |
| 2017/0340012 | A1 | 11/2017 | Mironov et al. | |
| 2018/0000164 | A1 | 1/2018 | Sears et al. | |
| 2018/0064169 | A1 | 3/2018 | Biel et al. | |
| 2018/0140014 | A1* | 5/2018 | Yu | A24F 40/44 |
| 2018/0140019 | A1 | 5/2018 | Guo et al. | |
| 2018/0295881 | A1* | 10/2018 | Mironov | A24F 40/46 |
| 2019/0000145 | A1 | 1/2019 | Bleloch et al. | |
| 2019/0230993 | A1 | 8/2019 | Buchberger | |
| 2019/0246692 | A1 | 8/2019 | Li et al. | |
| 2019/0313701 | A1 | 10/2019 | Cadieux et al. | |
| 2019/0350256 | A1 | 11/2019 | Hejazi | |
| 2020/0086067 | A1 | 3/2020 | Li et al. | |
| 2020/0229495 | A1 | 7/2020 | Buchberger | |
| 2020/0275701 | A1 | 9/2020 | Yu et al. | |
| 2021/0015157 | A1 | 1/2021 | Bleloch et al. | |
| 2021/0037886 | A1 | 2/2021 | Mironov et al. | |

FOREIGN PATENT DOCUMENTS

| | | | |
|---|---|---|---|
| CN | 107788580 | A | 3/2018 |
| CN | 108968160 | A | 12/2018 |
| CN | 109414078 | A | 3/2019 |
| CN | 209518269 | U | 10/2019 |
| KR | 0400449 | Y1 | 10/2005 |
| KR | 10-2017-0141662 | A | 12/2017 |
| KR | 10-2018-0036764 | A | 4/2018 |
| RU | 2 704 941 | C2 | 10/2019 |
| WO | WO 2015/117702 | A1 | 8/2015 |
| WO | WO 2015/117704 | A1 | 8/2015 |
| WO | WO 2017/207320 | A1 | 12/2017 |
| WO | WO 2017/207322 | A1 | 12/2017 |
| WO | WO 2019/157645 | A1 | 8/2019 |
| WO | WO 2019/157647 | A1 | 8/2019 |
| WO | WO 2019/157648 | A1 | 8/2019 |
| WO | WO 2019/157651 | A1 | 8/2019 |

OTHER PUBLICATIONS

Partial European Search Report issued Mar. 9, 2021, in corresponding European Patent Application No. 20197829.3, 14 pages.

Extended European Search Report issued Aug. 25, 2023 in European Patent Application No. 20154181.0, 16 pages.

Combined Russian Notice of Allowance and Search Report issued May 13, 2024 in Russian Patent Application No. 2022120564/07, 9 pages.

International Search Report & Written Opinion issued in PCT/EP2021/051849, filed on Jan. 27, 2021, 15 pages.

Japanese Office Action issued Feb. 17, 2025 in corresponding Japanese Patent Application No. 2022-545816, with English Translation, 4 pages.

Korean Office Action issued Nov. 3, 2025 in Korean Patent Application No. 10-2022-7028876 (with English Translation), 9 pages.

Office Action and Search Report dated Dec. 24, 2025, issued in corresponding Chinese Patent Application No. 202180011208.1 (with English translation).

* cited by examiner

HEATING ELEMENT HAVING HEAT CONDUCTIVE AND WICKING FILAMENTS

The present disclosure relates to a heating element for an aerosol-generating system. In particular, but not exclusively, the present invention relates to a heating element for a handheld electrically operated aerosol-generating system which is configured to heat a liquid aerosol-forming substrate to generate an aerosol and to deliver the aerosol into the mouth of a user. The present invention also relates to a heater assembly for an aerosol-generating system comprising the heating element, a cartridge for an aerosol-generating system, an aerosol-generating system and a method of manufacturing the heating element.

Handheld electrically operated aerosol-generating devices and systems are known that consist of a device portion comprising a battery and control electronics, a portion for containing or receiving a liquid aerosol-forming substrate and an electrically operated heater assembly for heating the aerosol-forming substrate to generate an aerosol. The heater assembly typically comprises a heating element in the form of a coil of wire which is wound around an elongate wick which transfers liquid aerosol-forming substrate from the liquid storage portion to the heater. In use, an electric current can be passed through the coil of wire to heat the heater assembly and thereby generate an aerosol from the liquid aerosol-forming substrate. A mouthpiece portion is also included on which a user may puff to draw aerosol into their mouth.

It is generally desirable for aerosol-generating systems to be able to produce aerosol which is consistent over successive uses of the system and is consistent between different aerosol generating systems of the same type. Variations in the quality and amount of aerosol generated can detract from the user's experience. It is particularly desirable to reduce the likelihood of a "dry heating" situation arising, i.e. a situation in which the heating element is heated with insufficient liquid aerosol-forming substrate being present. This situation is also known as a "dry puff" and can result in overheating and, potentially, thermal decomposition of the liquid aerosol-forming substrate, which can produce unwanted by-products.

To produce a consistent aerosol, the heating element needs to be consistently wetted with liquid aerosol-forming substrate for each puff on the aerosol-generating system by a user. However, with conventional wick and coil heater assemblies it can be difficult to achieve consistent wetting due to variations between different wicks. Wetting of the heating element also depends on the orientation of the aerosol-generating system and the amount of aerosol-forming substrate remaining in the liquid storage portion.

Furthermore, the ability to accurately and consistently manufacture heater assemblies is important in maintaining consistent performance between different aerosol generating systems of the same type. For example, in heater assemblies having a heating coil, the heating coils need to be produced with the same dimensions in order to reduce product-to-product variability. In known systems, the manufacture of the heater assembly may require a high number of manufacturing steps some of which may need to be carried out manually by an operator. Manual assembly increases the likelihood of variation between different heater assemblies and also increases the cost and complexity of the manufacturing process.

It would be desirable to provide a heating element for an aerosol-generating system which allows for more consistent wetting of the heating element. It would also be desirable to provide a heating element which can be more easily and consistently manufactured.

According to an example of the present disclosure, there is provided a heating element for an aerosol-generating system. The heating element may comprise a first filament. The first filament may be configured to heat a liquid aerosol-forming substrate. The heating element may comprise a second filament. The second filament may be configured to convey a liquid aerosol-forming substrate to wet at least a portion of the heating element with liquid aerosol-forming substrate According to an example of the present disclosure, there is provided a heating element for an aerosol-generating system. The heating element may comprise a plurality of first filaments. The plurality of first filaments may be configured to heat a liquid aerosol-forming substrate. The heating element may comprise a plurality of second filaments. The plurality of second filaments may be configured to convey a liquid aerosol-forming substrate to wet at least a portion of the heating element with liquid aerosol-forming substrate.

According to an example of the present disclosure, there is provided a heating element for an aerosol-generating system, the heating element comprising a plurality of first filaments and a plurality of second filaments, wherein the plurality of first filaments are configured to heat a liquid aerosol-forming substrate; and wherein the plurality of second filaments are configured to convey a liquid aerosol-forming substrate to wet at least a portion of the heating element with liquid aerosol-forming substrate.

The heating element is therefore a hybrid heating element comprising two different types of filament; a plurality of first filaments configured to heat a liquid aerosol-forming substrate and a plurality of second filaments configured to convey liquid aerosol-forming substrate. Advantageously, the plurality of second filaments convey liquid aerosol-forming substrate to and along the first filaments. The second filaments therefore act as wicks within the body of the heating element and help to wet the heating element with liquid aerosol-forming substrate by increasing the area of the first filaments which is in contact with liquid aerosol-forming substrate. The second filaments assist in distributing aerosol-forming substrate across the heating element to achieve improved wetting of the first filaments and an increased area of vaporisation. The heating element of the present disclosure helps to ensure a consistent area of the heating element is wetted during each use of an aerosol-generating system and therefore helps to generate a consistent amount of aerosol over successive uses and between different aerosol generating systems of the same type. The second filaments may also help improve integration of the heating element into a porous material or other form of transport material used to convey liquid aerosol-forming substrate to the heating element.

In addition, the second filaments help to increase the contact area between the heating element and a transport material.

The heating element may be a fluid permeable heating filament. The first filaments may be heating filaments. The second filaments may be wicking filaments.

The plurality of first filaments may be formed from an electrically conductive material. An electrically conductive material allows the heating element to be resistively or inductively heated.

The plurality of first filaments may comprise electrically resistive heating filaments.

The plurality of first filaments may be formed from a metallic material. The plurality of first filaments may be made from any suitable electrically conductive material. Suitable materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, constantan, nickel-, cobalt-, chromium-, aluminum-, titanium-, zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminum based alloys and iron-manganese-aluminum based alloys. Timetal® is a registered trade mark of Titanium Metals Corporation. Preferably, the plurality of first filaments are made from stainless steel, more preferably 300 series stainless steels like AISI 304, 312, 316, 304L, 316L or 400 series stainless steels like AISI 410, 420 or 430.

Additionally, the plurality of first filaments may comprise combinations of the above materials. A combination of materials may be used to improve the control of the resistance of the heating element. For example, materials with a high intrinsic resistance may be combined with materials with a low intrinsic resistance. This may be advantageous if one of the materials is more beneficial from other perspectives, for example price, machinability or other physical and chemical parameters. Advantageously, high resistivity heaters allow more efficient use of battery energy.

The plurality of first filaments may comprise wires. The plurality of first filaments may comprise electrically conductive threads.

The plurality of second filaments may be hydrophilic. The plurality of second filaments may be made from a hydrophilic material. Alternatively, the plurality of second filaments may be made from another material and coated with a hydrophilic material. A hydrophilic material has an affinity for water and is more easily wetted by an aqueous solution compared to non-hydrophilic materials. A hydrophilic second filament helps to convey liquid aerosol-forming substrate within the heating element to wet the heating element.

The plurality of second filaments may be formed from a metallic material. The plurality of second filaments may be formed from a non-metallic material. The plurality of second filaments may be made from, or coated with, any suitable hydrophilic material. Suitable materials include but are not limited to: polymers such as polyesters; cellulose fibres such as cotton, rayon or other regenerated fibres made from wood and agricultural products; glass; ceramics and composite materials made from a combination of the foregoing. In one example, the second filaments may be made from a ductile material such as a rayon as opposed to more brittle materials such as glass because ductile materials are more flexible and better suited to mass production techniques.

The plurality of second filaments may be fibrous. Each second filament may comprise one or more fibres. Each second filament may comprise a thread. The plurality of second filaments may comprise glass-fibre threads.

The plurality of second filaments may be formed from a non-hydrophilic material or even a hydrophobic material and surface treated to increase the material's hydrophilicity. Any suitable surface treatment which increases the surface energy of the material can be used and include, but are not limited to, plasma treatment and sand-blasting. In one example, the second filaments may be made from polyetheretherketone (PEEK) which has been surface treated to make it hydrophilic and improve its wettability. An advantage of using PEEK filaments is that they can be used to integrate the heating element to a heater mount which is also made of PEEK or another suitable polymer. By placing the heating element on the PEEK heater mount and heating both of them to at least the glass transition temperature of PEEK, the PEEK filaments of the heating element will bind to the PEEK heater mount and hold the heating element on the heater mount.

The plurality of first filaments may comprise inductive heating filaments such that the plurality of first filaments are inductively heated when the heating element is placed in a varying magnetic field. The plurality of first filaments are preferably aligned with, or substantially parallel to, the direction of the varying magnetic field.

The plurality of first filaments may be formed from a susceptor material. As used herein, the term "susceptor material" refers to a material that is capable of converting magnetic energy into heat. When a susceptor is located in a varying magnetic field, such as a varying magnetic field generated by an inductor coil, the susceptor is heated. Heating of the susceptor may be the result of at least one of hysteresis losses and eddy currents induced in the susceptor material, depending on the electrical and magnetic properties of the susceptor material.

The susceptor material may be, or may comprise, any material that can be inductively heated to a temperature sufficient to release volatile compounds from the aerosol-forming substrate. Preferred susceptor materials may be heated to a temperature in excess of 100, 150, 200 or 250 degrees Celsius. Preferred susceptor materials may be electrically conductive. Suitable susceptor materials include graphite, molybdenum, silicon carbide, stainless steels, niobium, aluminium, nickel, nickel containing compounds, titanium, and composites of metallic materials. Preferred susceptor materials may comprise a metal or carbon. Some preferred susceptor materials may be ferromagnetic, for example, ferritic iron, a ferromagnetic alloy, such as ferromagnetic steel or stainless steel, ferromagnetic particles, and ferrite. A susceptor material may comprise at least 5 percent, at least 20 percent, at least 50 percent or at least 90 percent of ferromagnetic or paramagnetic materials. Preferred susceptor materials may comprise, or be formed from, 400 series stainless steels, for example AISI 410, 420, or 430. Different materials will dissipate different amounts of energy when positioned within electromagnetic fields having similar values of frequency and field strength. Thus, parameters of the susceptor material such as material type and size may be altered to provide a desired power dissipation within a known electromagnetic field.

In one example, the plurality of first filaments may be formed from a magnetic metallic material. The plurality of second filaments may be formed from a non-metallic hydrophilic material. The heating element may further comprise a plurality of third filaments which are formed from a non-magnetic metallic material. Advantageously, by providing a plurality of third filaments formed from a non-magnetic material, a region of the heating element is created which is not inductively heated to a significant degree when placed in a varying magnetic field due to the non-magnetic material not generating an appreciable amount of heat compared to the magnetic material. This is because non-magnetic materials are heated due to eddy currents in the material, particularly in a region of the material near its surface (the so called “skin” effect) but magnetic materials are heated due to eddy currents in the skin and due to hysteresis losses in the magnetic material. The additional hysteresis losses in magnetic materials help to generate more heat. For example, when stainless steel filaments are placed in a varying magnetic field having a frequency of approximately 6.78 megahertz and a field strength of around 1 to 10 amperes per metre, magnetic stainless steel generates approximately 10 times more heat than non-magnetic stainless steel. The plurality of third filaments may have a structural function. For example, the plurality of third filaments may form part of the heating element which is connected to, or contacts, a heater mount or mesh holder. Such an arrangement reduces the amount of heat from the heating element which is dissipated into the heater mount and also reduces the likelihood of thermal damage to the heater mount. The frequency and field strength of the magnetic field may be adapted depending on the materials being used.

In another example, the plurality of first filaments may be formed from a magnetic metallic material. The plurality of second filaments may be formed from a magnetic metallic material. The heating element may further comprise a plurality of third filaments which are formed from a non-magnetic metallic material. The plurality of third filaments may extend in the same direction as the plurality of second filaments. The plurality of third filaments may be arranged in two portions or groups on opposing sides of the heating element. The plurality of third filaments may form a part of the heating element which is connected to, or contacts, a heater mount or mesh holder. The plurality of second heating elements may form a part of the heating element which is arranged within or across an opening or channel of a heater mount or mesh holder. The pluralities of second and third filaments may be more closely arranged or more densely packed than the plurality of first filaments. Each of the plurality of second filaments may be in contact with a neighbouring one of the plurality of second filaments at one or more points along its length. Each of the plurality of third filaments may be in contact with a neighbouring one of the plurality of third filaments at one or more points along its length.

The plurality of first filaments may be made from 400 series stainless steels like AISI 410, 420 or 430. 400 series stainless steels are generally magnetic. The plurality of third filaments may be made from 300 series stainless steels like AISI 304, 312, 316, 304L, 316L. 300 series stainless steels are generally non-magnetic.

Each second filament may extend alongside a respective one of the first filaments to help convey or draw liquid aerosol-forming substrate along the first filament. Each second filament may extend in a space between two neighbouring first filaments to help convey or draw liquid aerosol-forming substrate into the spaces between neighbouring first filaments and along the first filaments. Each second filament may substantially fill the space between two neighbouring first filaments. The second filament may convey liquid aerosol-forming substrate by capillary action or wicking. The second filament may convey liquid aerosol-forming substrate by capillary action or wicking within the body of the filament itself, for example, between fibres of the second filament. Alternatively, or additionally, a space between a first filament and a second filament may act as a capillary channel which conveys liquid aerosol-forming substrate.

The plurality of first filaments and the plurality of second filaments may extend in the same direction. The plurality of first filaments and the plurality of second filaments may be interlaced. By “interlaced” it is meant that the plurality of first filaments and the plurality of second filaments are arranged in an array with alternating first and second filaments. The plurality of first filaments and the plurality of second filaments may be arranged parallel to one another. This arrangement helps to convey or draw liquid aerosol-forming substrate into the spaces between the first filaments and along the first filaments, which in turn helps to wet the heating element. As a result, the area of the first filaments which is in contact with liquid aerosol-forming substrate is increased, which assists in improving the vaporisation of liquid aerosol-forming substrate.

The heating element may comprise an array of filaments or a fabric of filaments. In one example, the plurality of first filaments may be arranged to form a mesh. As used herein, the term “mesh” refers to a network of filaments having a plurality of interstices or apertures therein. The mesh may comprise a portion of the plurality of first filaments arranged in a first direction and another portion of the plurality of first filaments arranged in a second direction. The second direction may be transverse to the first direction. The second direction may be substantially orthogonal to the first direction. Separate ones of the plurality of second filaments may be arranged between at least some of the first filaments. Separate ones of the plurality of second filaments may be arranged in at least one of the first or second directions. In this arrangement, the second filaments may help to convey or draw liquid aerosol-forming substrate into the interstices or apertures in the mesh of first filaments and along the first filaments, which in turn helps to wet the heating element.

The plurality of second filaments may be arranged in only one of a the first and second directions. The plurality of second filaments may be arranged in both the first and second directions. The plurality of second filaments may be arranged between the plurality of first filaments such that each space between neighbouring ones of the plurality of first filaments contains a second filament.

In another example, the heating element may be arranged to form a mesh. The plurality of first filaments may be arranged in a first direction. The plurality of second filaments may be arranged in a second direction. The second direction may transverse to the first direction. The second direction may be substantially orthogonal to the first direction. This arrangement helps to convey or draw liquid aerosol-forming substrate into the heating element, which in turn helps to wet the heating element.

The mesh may be woven or non-woven. The mesh may be formed using different types of weave or lattice structures.

The heating element may comprise an interwoven mesh. Interweaving the plurality of first filaments and the plurality of second filaments helps to improve the strength of the mesh. Furthermore, an interwoven mesh results in at least one of the plurality of first filaments and the plurality of second filaments having an undulating configuration as it weaves through the other plurality of filaments. This undulating configuration may assist in integrating the heating element into a transport material because the undulating portions of the filaments may be embedded into a transport material.

Where the heating element comprises an interwoven mesh, a first direction of the filaments may be a warp direction and a second direction of the filaments may be a weft direction.

In an example in which the filaments of the heating element are made from the same material, then the filaments arranged in the weft direction may have a diameter or thickness that is equal to or less than that of the filaments arranged in the warp direction. This arrangement results in the weft filaments being at least as flexible and deformable, and preferably more flexible and deformable, than the warp filaments. This assists with weaving the weft filaments around the warp filaments.

In another example in which the heating element comprises both metallic filaments and non-metallic filaments, then the metallic filaments may be warp and the non-metallic filaments may be weft. In which case, the non-metallic filaments may be selected such that they are more flexible and deformable than the metallic filaments. This assists with weaving the weft filaments around the warp filaments.

The mesh heating element may comprise a plurality of first filaments formed from a magnetic metallic material. The mesh heating element may comprise a plurality of second filaments formed from a magnetic metallic material. The mesh heating element may further comprise a plurality of third filaments which are formed from a non-magnetic metallic material such that the plurality of third filaments are not inductively heated to a significant degree when placed in a varying magnetic field. The plurality of third filaments may be woven in the same direction as the plurality of second filaments. The plurality of third filaments may form at least one part of the heating element which is connected to, or contacts, a heater mount or mesh holder. This arrangement reduces heat loss of the heater mount. The plurality of second heating elements may be comprised in a part of the heating element which is arranged within or across an opening or channel of a heater mount or mesh holder. The pluralities of second and third filaments may be more closely arranged or more densely packed than the plurality of first filaments. Each of the plurality of second filaments may be in contact or touching engagement with a neighbouring one of the plurality of second filaments at one or more points along its length. Each of the plurality of third filaments may be in contact or touching engagement with a neighbouring one of the plurality of third filaments at one or more points along its length. By arranging the pluralities of second and third filaments in contact with one another, no space will be visible between the filaments when viewed from an angle perpendicular to the plane of the mesh. Such a dense mesh pattern helps to convey liquid aerosol-forming substrate within the mesh.

The plurality of first filaments may define interstices or apertures between the filaments and the interstices may have a width of between 10 micrometres and 300 micrometres, preferably between 20 micrometres and 100 micrometres, preferably between 50 micrometres and 100 micrometres, more preferably approximately 70 micrometres.

The plurality of first filaments may form a mesh of size between 60 and 240 filaments per centimetre (+/−10 percent). Preferably, the mesh density is between 100 and 140 filaments per centimetres (+/−10 percent). More preferably, the mesh density is approximately 115 filaments per centimetre.

The percentage of open area of the mesh, which is the ratio of the area of the interstices or apertures to the total area of the mesh may be between 40 percent and 90 percent, preferably between 85 percent and 80 percent, more preferably approximately 82 percent.

Each of the first filaments or wires of the heating element may have an average diameter of at least 10, 16, 17, 25 or 30 microns. Each of the first filaments or wires may have an average diameter of less than 100, 90, 80, 70, 60, 50, 40, or 30 microns. Each of the first filaments or wires may have an average diameter of between 10 and 80 microns, preferably between 10 and 50 microns, and more preferably between 15 and 30 microns, for example, around 25 microns.

The plurality of second filaments may have a cross-sectional profile which is deformed or flattened. Each of the second filaments may have a width which is approximately equal to the aperture size of the mesh such that the second filament occupies substantially all, or at least 80 percent, of the space between neighbouring first filaments. Each of the second filaments may have a thickness which is approximately equal to the diameter or thickness of the first filaments.

The second filaments or fibres may have an average diameter between 80% and 120% of an average diameter of the first filaments or wires. The first filaments and second filaments may have substantially identical average diameters.

Each of the second filaments or fibres may have an average diameter of at least 10, 16, 17, 25 or 30 microns. Each of the second filaments or fibres may have an average diameter of less than 100, 90, 80, 70, 60, 50, 40, or 30 microns. Each of the second filaments or fibres may have an average diameter of between 10 and 80 microns, preferably between 10 and 50 microns, and more preferably between 15 and 30 microns, for example, around 25 microns.

The heating element may be substantially flat. The heating element may be substantially planar. Advantageously, a flat or planar heating element may be easily handled during manufacture and may provide a robust heater assembly construction.

As used herein, the term “flat” is used to refer to a substantially two dimensional topological manifold. Thus, a flat heating element may extend in two dimensions along a surface substantially more than in a third dimension. The dimensions of the flat heating element in the two dimensions within the surface may be at least 2, 5, or 10 times larger than in the third dimension, normal to the surface. An example of a substantially flat heating element is a structure between two substantially parallel surfaces, wherein the distance between these two imaginary surfaces is substantially smaller than the extension within the surfaces. In some examples, the substantially flat heating element may engage with a surface of a transport material such as a porous ceramic body.

In other examples, the heating element is curved along one or more dimensions, for example forming a dome shape or bridge shape.

The area of the heating element may be small, for example less than or equal to 50 square millimetres, preferably less than or equal to 25 square millimetres, more preferably approximately 15 square millimetres. The size is chosen such to incorporate the heating element into a handheld system. Sizing of the heating element to be less than or equal to 50 square millimetres reduces the amount of total power required to heat the heating element while still ensuring sufficient contact of the heating element with the liquid aerosol-forming substrate. The heating element may, for example, be rectangular and have a length between 2 millimetres to 10 millimetres and a width between 2 millimetres and 10 millimetres. Preferably, the heating element has dimensions of approximately 5 millimetres by 3 millimetres.

The electrical resistance of the heating element may be between 0.3 Ohms and 4 Ohms. Preferably, the electrical resistance is equal to, or greater than, 0.5 Ohms. More preferably, the electrical resistance of the heating element is between 0.6 Ohms and 0.8 Ohms, and most preferably about 0.68 Ohms. The electrical resistivity of the heating element is preferably at least an order of magnitude, and more preferably at least two orders of magnitude, greater than the electrical resistivity of any electrically conductive contact portions. This ensures that the heat generated by passing current through the heating element is localized to the heating element. It is advantageous to have a low overall resistance for the heating element if the system is powered by a battery. A low resistance, high current system allows for the delivery of high power to the heating element. This allows the heating element to heat the electrically conductive filaments to a desired temperature quickly.

According to an example of the present disclosure, there is provided a heater assembly for an aerosol-generating system. The heater assembly may comprise a heating element according to any of the examples described above. The heater assembly may comprise a transport material for conveying a liquid aerosol-forming substrate to the heating element.

According to an example of the present disclosure, there is provided a heater assembly for an aerosol-generating system, the heater assembly comprising a heating element according to any of the examples described above and a transport material for conveying a liquid aerosol-forming substrate to the heating element.

The transport material may comprise a capillary material. As used herein, a “capillary material” refers to a material that transfer liquid from one end of the material to another by means of capillary action. The capillary material may have a fibrous or porous structure. The capillary material preferably comprises a bundle of capillaries. For example, the capillary material may comprise a plurality of fibres or threads or fine bore tubes. The fibres or threads may be generally aligned to convey liquid aerosol-forming substrate in a particular direction, for example, towards the heating element. Alternatively, the capillary material may comprise sponge-like or foam-like material. The structure of the capillary material forms a plurality of small bores or tubes, through which the liquid aerosol-forming substrate can be transported by capillary action. The capillary material may extend into interstices or apertures in the heater. The heater may draw liquid aerosol-forming substrate into the interstices or apertures by capillary action.

The transport material may comprise any suitable material or combination of materials. Examples of suitable materials are a sponge or foam material, ceramic- or graphite-based materials in the form of fibres or sintered powders, foamed metal or plastics material, a fibrous material, for example made of spun or extruded fibres, such as cellulose acetate, polyester, or bonded polyolefin, polyethylene, terylene or polypropylene fibres, nylon fibres or ceramic. The transport material may have any suitable capillarity and porosity so as to be used with different liquid physical properties. The liquid aerosol-forming substrate has physical properties, including but not limited to viscosity, surface tension, density, thermal conductivity, boiling point and vapour pressure, which allow the liquid aerosol-forming substrate to be transported through the transport material by capillary action. The transport material may comprise a porous ceramic body.

Portions of some of the plurality of second filaments may be integrated into the transport material. Some of the plurality of second filaments may have portions which extend away from the plane or body of the heating element, which portions may be integrated into the transport material. For example, some of the plurality of second filaments may have an undulating shape or loops or loose ends which may be integrated or embedded into the transport material. An advantage of integrating portions of the second filaments into the transport material is that it helps to improve contact between the heating element and the transport material and the conveyance of liquid aerosol-forming substrate to the heating element.

The heating element may be fixedly attached to the transport material. The heating element may be welded or soldered to the transport material. The heating element may be attached to the transport material by binding sites formed between portions of the second filaments and the transport material. The binding sites may be form by thermal fusion. Alternatively, the transport material may be directly deposited on to the heating element by some form of chemical, vapour or electro deposition process.

The heater assembly may further comprise at least two electrical contacts for supplying electrical power to the heating element. Each of the electrical contacts may be connected to at least one of the plurality of first filaments. Each of the electrical contacts may be connected to a plurality of the first filaments. Each of the electrical contacts may be connected to substantially all of the first filaments. The electrical contacts may be directly connected to one or more of the first filaments. The electrical contacts may be connected to one or more of the first filaments by solder.

Where the heater assembly has a heating element in which the electrical contacts are directly connected to one or more of the first filaments, the plurality of first filaments may be arranged in a weft direction. As discussed above, the plurality of first filaments are the heating filaments and the filaments through which electrical current is passed. By arranging the plurality of first filaments as the weft filaments, the undulating nature of weft filaments around the warp filaments helps to bring the first filaments into direct connection with the electrical contacts. This helps to improve the electrical connection between the heating element and the electrical contacts and reduces thermal losses which may be caused by an indirect connection.

Each of the electrical contacts may be connected to at least one of the plurality of third filaments. The electrical contacts may be connected to a region of the heating element which is not heated to an appreciable extent during use. This reduces thermal stress on the electrical contacts.

The electrical contacts may be positioned on opposite ends or sides of the heating element. The electrical contacts may comprise two electrically conductive contact pads. The electrically conductive contact pads may be positioned at an edge area of the heating element. Preferably, the at least two electrically conductive contact pads may be positioned on extremities of the heating element. An electrically conductive contact pad may comprise a tin patch. Alternatively, an electrically conductive contact pad may be integral with the fluid permeable heating element.

According to an example of the present disclosure, there is provided a cartridge for an aerosol-generating system. The cartridge may comprise a heater assembly according to any of the examples described above. The cartridge may comprise a liquid storage portion for holding a liquid aerosol-forming substrate.

According to an example of the present disclosure, there is provided a cartridge for an aerosol-generating system, the cartridge comprising a heater assembly according to any of the examples described above and a liquid storage portion for holding a liquid aerosol-forming substrate.

The terms “liquid storage portion” and “liquid storage compartment” are used interchangeably herein. The liquid storage portion or compartment may have first and second storage portions in communication with one another. A first storage portion of the liquid storage compartment may be on an opposite side of the heater assembly to the second storage portion of the liquid storage compartment. Liquid aerosol-forming substrate is held in both the first and second storage portions of the liquid storage compartment.

Advantageously, the first storage portion of the storage compartment is larger than the second storage portion of the liquid storage compartment. The cartridge may be configured to allow a user to draw or suck on the cartridge to inhale aerosol generated in the cartridge. In use a mouth end opening of the cartridge is typically positioned above the heater assembly, with the first storage portion of the storage compartment positioned between the mouth end opening and the heater assembly. Having the first storage portion of the liquid storage compartment above the second storage portion of the liquid storage compartment ensures that liquid is delivered from the first storage portion of the liquid storage compartment to the second storage portion of the liquid storage compartment, and so to the heater assembly, during use, under the influence of gravity.

The cartridge may have a mouth end through which generated aerosol can be drawn by a user and a connection end configured to connect to an aerosol-generating device, wherein a first side of the heater assembly faces the mouth end and a second side of the heater assembly faces the connection end.

The cartridge may define an enclosed airflow path or passage from an air inlet past a first side of the heater assembly to a mouth end opening of the cartridge. The enclosed airflow passage may pass through the first or second storage portion of the liquid storage compartment. In one embodiment the airflow path extends between the first and second storage portions of the liquid storage compartment. Additionally, the air flow passage may extend through the first storage portion of the liquid storage compartment. For example, the first storage portion of the liquid storage compartment may have an annular cross section, with the air flow passage extending from the heater assembly to the mouth end portion through the first storage portion of the liquid storage compartment. Alternatively, the airflow passage may extend from the heater assembly to the mouth end opening adjacent to the first storage portion of the liquid storage compartment.

The cartridge may contain a retention material for holding a liquid aerosol-forming substrate. The retention material may be in the first storage portion of the liquid storage compartment, the second storage portion of the liquid storage compartment or both the first and second storage portions of the liquid storage compartment. The retention material may be a foam, a sponge or a collection of fibres. The retention material may be formed from a polymer or co-polymer. In one embodiment, the retention material is a spun polymer. The liquid aerosol-forming substrate may be released into the retention material during use. For example, the liquid aerosol-forming substrate may be provided in a capsule.

The cartridge advantageously contains liquid aerosol-forming substrate. As used herein, the term "aerosol-forming substrate" refers to a substrate capable of releasing volatile compounds that can form an aerosol. Volatile compounds may be released by heating the aerosol-forming substrate.

The aerosol-forming substrate may be liquid at room temperature. The aerosol-forming substrate may comprise both liquid and solid components. The liquid aerosol-forming substrate may comprise nicotine. The nicotine containing liquid aerosol-forming substrate may be a nicotine salt matrix. The liquid aerosol-forming substrate may comprise plant-based material. The liquid aerosol-forming substrate may comprise tobacco. The liquid aerosol-forming substrate may comprise a tobacco-containing material containing volatile tobacco flavour compounds, which are released from the aerosol-forming substrate upon heating. The liquid aerosol-forming substrate may comprise homogenised tobacco material. The liquid aerosol-forming substrate may comprise a non-tobacco-containing material. The liquid aerosol-forming substrate may comprise homogenised plant-based material.

The liquid aerosol-forming substrate may comprise one or more aerosol-formers. An aerosol-former is any suitable known compound or mixture of compounds that, in use, facilitates formation of a dense and stable aerosol and that is substantially resistant to thermal degradation at the temperature of operation of the system. Examples of suitable aerosol formers include glycerine and propylene glycol. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. The liquid aerosol-forming substrate may comprise water, solvents, ethanol, plant extracts and natural or artificial flavours.

The liquid aerosol-forming substrate may comprise nicotine and at least one aerosol-former. The aerosol-former may be glycerine or propylene glycol. The aerosol former may comprise both glycerine and propylene glycol. The liquid aerosol-forming substrate may have a nicotine concentration of between about 0.5% and about 10%, for example about 2%.

The cartridge may comprise a housing. The housing may be formed form a mouldable plastics material, such as polypropylene (PP) or polyethylene terephthalate (PET). The housing may form a part or all of a wall of one or both portions of the liquid storage compartment. The housing and liquid storage compartment may be integrally formed. Alternatively the liquid storage compartment may be formed separately from the housing and assembled to the housing.

According to an example of the present disclosure, there is provided an aerosol-generating system. The aerosol-generating system may comprise a cartridge according to any of the examples described above. The aerosol-generating system may comprise an aerosol-generating device. The cartridge may be configured to be removably coupled to the aerosol-generating device. The aerosol-generating device may comprise a power supply for supplying electrical power to the heating element.

According to an example of the present disclosure, there is provided an aerosol-generating system comprising: a cartridge according to any of the examples described above; and an aerosol-generating device, wherein the cartridge is configured to be removably coupled to the aerosol-generating device, the aerosol-generating device comprising a power supply for supplying electrical power to the heating element.

The aerosol-generating device may further comprise control circuitry configured to control a supply of electrical power to the heater assembly.

The aerosol-generating device may be configured to inductively heat the heating element. The aerosol-generating device may comprise an inductor for inductively heating the heating element. The inductor may be an induction coil.

The control circuitry may comprise a microprocessor. The microprocessor may be a programmable microprocessor, a microcontroller, or an application specific integrated chip (ASIC) or other electronic circuitry capable of providing control. The control circuitry may comprise further electronic components. For example, in some embodiments, the control circuitry may comprise any of: sensors, switches, display elements. Power may be supplied to the heater assembly continuously following activation of the device or may be supplied intermittently, such as on a puff-by-puff basis. The power may be supplied to the heater assembly in the form of pulses of electrical current, for example, by means of pulse width modulation (PWM).

The power supply may be a DC power supply. The power supply may be a battery. The battery may be a Lithium based battery, for example a Lithium-Cobalt, a Lithium-Iron-Phosphate, a Lithium Titanate or a Lithium-Polymer battery. The battery may be a Nickel-metal hydride battery or a Nickel cadmium battery. The power supply may be another form of charge storage device such as a capacitor. The power supply may be rechargeable and be configured for many cycles of charge and discharge. The power supply may have a capacity that allows for the storage of enough energy for one or more user experiences; for example, the power supply may have sufficient capacity to allow for the continuous generation of aerosol for a period of about six minutes, corresponding to the typical time taken to smoke a conventional cigarette, or for a period that is a multiple of six minutes. In another example, the power supply may have sufficient capacity to allow for a predetermined number of puffs or discrete activations of the heater assembly.

The aerosol-generating device may comprise a housing. The housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material is preferably light and non-brittle.

The aerosol-generating system may be a handheld aerosol-generating system. The aerosol-generating system may be a handheld aerosol-generating system configured to allow a user to puff on a mouthpiece to draw an aerosol through a mouth end opening. The aerosol-generating system may have a size comparable to a conventional cigar or cigarette. The aerosol-generating system may have a total length between about 30 mm and about 150 mm. The aerosol-generating system may have an external diameter between about 5 mm and about 30 mm.

According to an example of the present disclosure, there is provided a method of manufacturing a heating element for an aerosol-generating system. The method may comprise providing a plurality of first filaments. The plurality of first filaments may be configured to heat a liquid aerosol-forming substrate. The method may comprise providing a plurality of second filaments. The plurality of second filaments may be configured to convey a liquid aerosol-forming substrate along at least a portion of their length to distribute a liquid aerosol-forming substrate across at least a portion of the heating element.

According to an example of the present disclosure, there is provided a method of manufacturing a heating element for an aerosol-generating system, the method comprising: providing a plurality of first filaments configured to heat a liquid aerosol-forming substrate; and providing a plurality of second filaments configured to convey a liquid aerosol-forming substrate along at least a portion of their length to distribute a liquid aerosol-forming substrate across at least a portion of the heating element.

Advantageously, the plurality of second filaments are arranged to convey liquid aerosol-forming substrate to and along the first filaments. The second filaments therefore act as wicks but within the body of the heating element and help to wet the heating element with liquid aerosol-forming substrate by increasing the area of the first filaments which is in contact with liquid aerosol-forming substrate. The second filaments assist in distributing aerosol-forming substrate across the heating element to achieve improved wetting of the first filaments and an increased area of vaporisation. The heating element of the present disclosure helps to ensure a consistent area of the heating element is wetted during each use of an aerosol-generating system and therefore helps to generate a consistent amount of aerosol over successive uses and between different aerosol generating systems of the same type. The second filaments may also help improve integration of the heating element into a porous material or other form of transport material used to convey liquid aerosol-forming substrate to the heating element. In addition, the second filaments help to increase the contact area between the heating element and a transport material.

Advantageously, by incorporating the plurality of second filaments in to the heating element, consistency of aerosol delivery can be improved and product-to-product variation is reduced. The heating element can also be simply and consistently manufactured using mass production techniques.

In one example, the heating element may comprise a mesh. The method may comprise alternatingly arranging a first filament and a second filament in a first direction and arranging a first filament in a second direction. Alternatively, the method may comprise alternatingly arranging a first filament and a second filament in the second direction.

In another example, the heating element may comprise a mesh. The method may comprise arranging the plurality of first filaments in a first direction and arranging the plurality of second filaments in a second direction.

Features described in relation to one of the above examples may equally be applied to other examples of the present disclosure.

The invention is defined in the claims. However, below there is provided a non-exhaustive list of non-limiting examples. Any one or more of the features of these examples may be combined with any one or more features of another example, embodiment, or aspect described herein.

Example Ex1: A heating element for an aerosol-generating system, the heating element comprising: a first filament configured to heat a liquid aerosol-forming substrate; and a second filament configured to convey a liquid aerosol-forming substrate to wet at least a portion of the heating element with liquid aerosol-forming substrate.

Example Ex2: A heating element according to example Ex1, wherein the heating element comprises a plurality of first filaments and a plurality of second filaments.

Example Ex3: A heating element according to example Ex1 or Ex 2, wherein the first filament(s) is/are formed from an electrically conductive material.

Example Ex4: A heating element according to any of examples Ex1 to Ex 3, wherein the first filament(s) is/are formed from a metallic material.

Example Ex5: A heating element according to any preceding example, wherein the second filament(s) is/are hydrophilic.

Example Ex6: A heating element according to any preceding example, wherein the second filament(s) is/are formed from a non-metallic material.

Example Ex7: A heating element according to example Ex2, wherein the plurality of first filaments are formed from a magnetic metallic material and the plurality of second filaments are formed from a non-metallic hydrophilic material, and wherein the heating element further comprises a plurality of third filaments which are formed from a non-magnetic metallic material.

Example Ex8: A heating element according to any of examples Ex2 to Ex7, wherein the plurality of first filaments and the plurality of second filaments extend in the same direction and are interlaced.

Example Ex9: A heating element according to any of examples Ex2 to Ex7, wherein the plurality of first filaments are arranged to form a mesh in which a portion of the plurality of first filaments are arranged in a first direction and another portion of the plurality of first filaments are arranged in a second direction transverse to the first direction, and wherein separate ones of the plurality of second filaments are arranged between at least some of the first filaments in at least one of the first or second directions.

Example Ex10: A heating element according to example Ex9, wherein the plurality of second filaments may be arranged in both the first and second directions.

Example Ex11: A heating element according to example Ex9 or Ex10, wherein the plurality of second filaments may be arranged between the plurality of first filaments such that each space between neighbouring ones of the plurality of first filaments contains a second filament.

Example Ex12: A heating element according to any of examples Ex2 to Ex7, wherein the heating element is arranged to form a mesh, wherein the plurality of first filaments are arranged in a first direction and the plurality of second filaments are arranged in a second direction, wherein the second direction is transverse to the first direction.

Example Ex13: A heating element according to any of examples Ex9 to Ex12, wherein the heating element comprises an interwoven mesh.

Example Ex14: A heating element according to any preceding example, wherein each of the first filaments has an average diameter of between 10 and 80 microns, preferably between 10 and 50 microns, and more preferably about 25 microns.

Example Ex15: A heating element according to any preceding example, wherein each of the second filaments has an average diameter of between 10 and 80 microns, preferably between 10 and 50 microns, and more preferably about 25 microns.

Example Ex16: A heating element according to any preceding example, wherein the heating element is substantially flat.

Example Ex17: A heater assembly for an aerosol-generating system, the heater assembly comprising a heating element according to any of the preceding examples and a transport material for conveying a liquid aerosol-forming substrate to the heating element.

Example Ex18: A heater assembly according to example Ex17, wherein portions of some of the plurality of second filaments are integrated into the transport material.

Example Ex19: A heater assembly according to example Ex17 or Ex18, further comprising at least two electrical contacts for supplying electrical power to the heating element, wherein each of the electrical contacts is connected to at least one of the plurality of first filaments.

Example Ex20: A cartridge for an aerosol-generating system, the cartridge comprising a heater assembly according to any of examples Ex17 to Ex19 and a liquid storage portion for holding a liquid aerosol-forming substrate.

Example Ex21: An aerosol-generating system comprising: a cartridge according to example Ex20; and an aerosol-generating device, wherein the cartridge is configured to be removably coupled to the aerosol-generating device, the aerosol-generating device comprising a power supply for supplying electrical power to the heating element.

Example Ex22: A method of manufacturing a heating element for an aerosol-generating system, the method comprising: providing a plurality of first filaments configured to heat a liquid aerosol-forming substrate; and providing a plurality of second filaments configured to convey a liquid aerosol-forming substrate along at least a portion of their length to distribute a liquid aerosol-forming substrate across at least a portion of the heating element.

Example Ex23: A method according to example Ex22, wherein the heating element comprises a mesh and the method further comprises alternatingly arranging a first filament and a second filament in a first direction and arranging a first filament in a second direction.

Example Ex24: A method according to example Ex22 or Ex23, wherein the method further comprises alternatingly arranging a first filament and a second filament in the second direction.

Example Ex25: A method according to example Ex22, wherein the heating element comprises a mesh and the method comprises arranging the plurality of first filaments in a first direction and arranging the plurality of second filaments in a second direction.

Examples will now be further described with reference to the figures in which.

Figure 1:
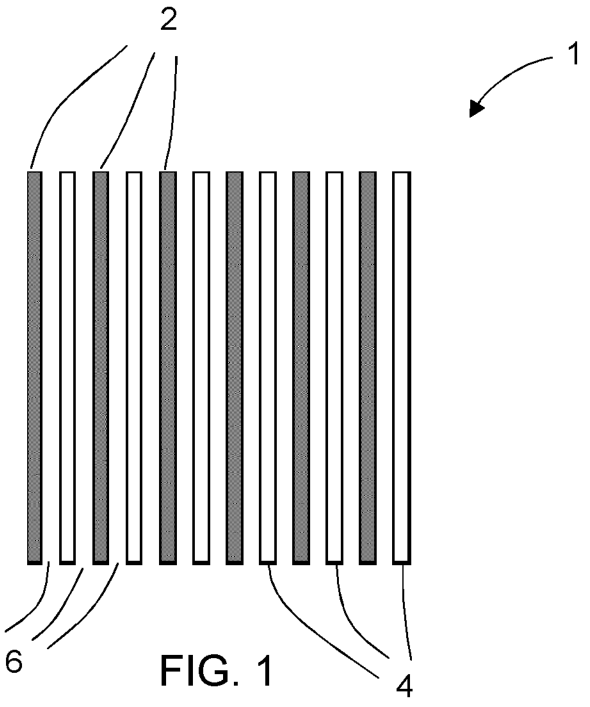
FIG. 1 is a schematic plan view of a heating element in accordance with an example of the present disclosure.

Referring to FIG. 1, there is shown a schematic plan view of a heating element 1. The heating element 1 is a hybrid heating element comprising a plurality of first filaments 2, which are configured to heat a liquid aerosol-forming substrate (not shown), and a plurality of second filaments 4, which are configured to convey a liquid aerosol-forming substrate to wet at least a portion of the heating element 1 with liquid aerosol-forming substrate. The plurality of first filaments 2 and plurality of second filaments 4 extend in the same direction and are interlaced. In other words, each second filament 4 is arranged between neighbouring ones of the plurality of first filaments 2. The plurality of first filaments 2 and plurality of second filaments 4 are held in place by attaching them to an underlying substrate or transport material (not shown).

The plurality of first filaments 2 are electrically conductive and are made from stainless steel wire. The plurality of second filaments 4 are made from glass fibre threads which are hydrophilic. Liquid aerosol-forming substrate is conveyed or drawn along the length of the plurality of second filaments 4 by capillary action between the fibres of the glass fibre threads. This, in turn, helps to draw or convey liquid aerosol-forming substrate along the plurality of first filaments 2. In addition, the spaces 6 between the first 2 and second 4 filaments act as capillary channels which help to convey and draw liquid aerosol-forming substrate along the plurality of first filaments 2. Therefore, the plurality of second filaments 4 help to consistently wet the heating element 1 by distributing liquid aerosol-forming substrate within or over the heating element 1.

In use, the plurality of first filaments 2 of the heating element 1 may be inductively or resistively heated. Heat generated by the plurality of first filaments 2 vaporises the liquid aerosol-forming substrate, which is released from the heating element 1 in the spaces 6 between the first 2 and second 4 filaments. The glass fibre threads of the plurality of second filaments 4 are able to withstand the temperatures of the plurality of first filaments 2 during heating.

Figure 2:
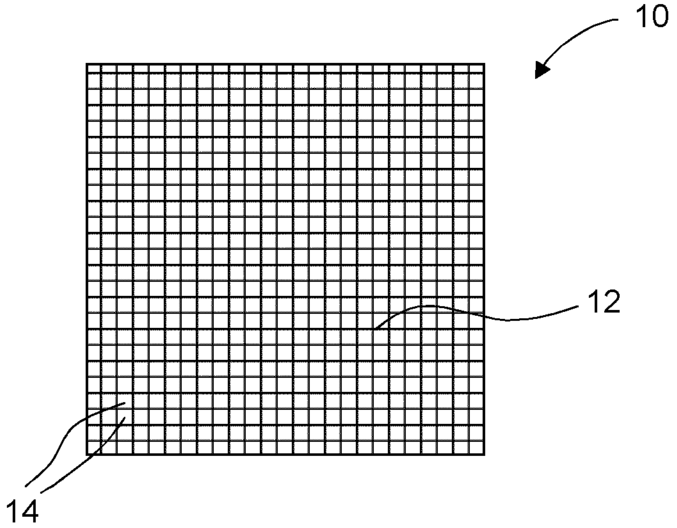
FIG. 2 is a schematic plan view of a heating element in accordance with another example of the present disclosure.
Figure 3A:
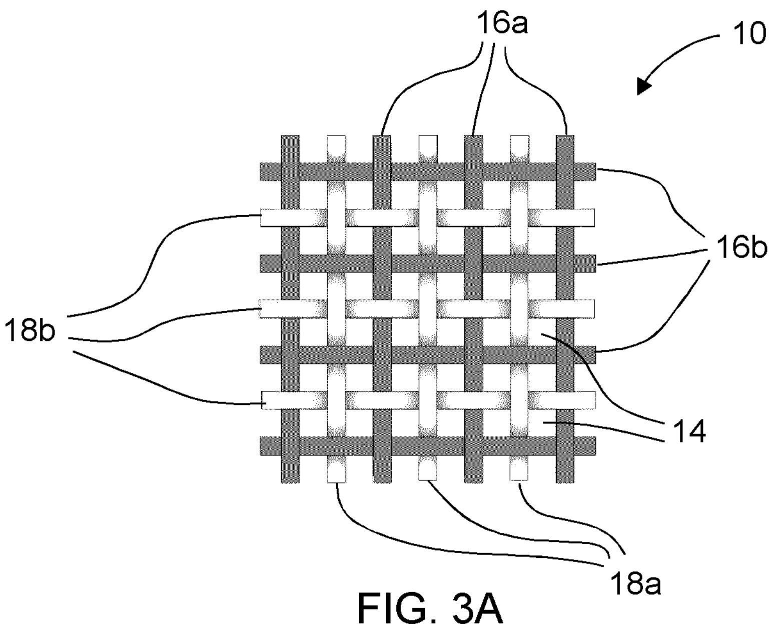
FIG. 3A is a schematic illustration of one arrangement of the filaments of the heating element of FIG. 2.
Figure 3B:
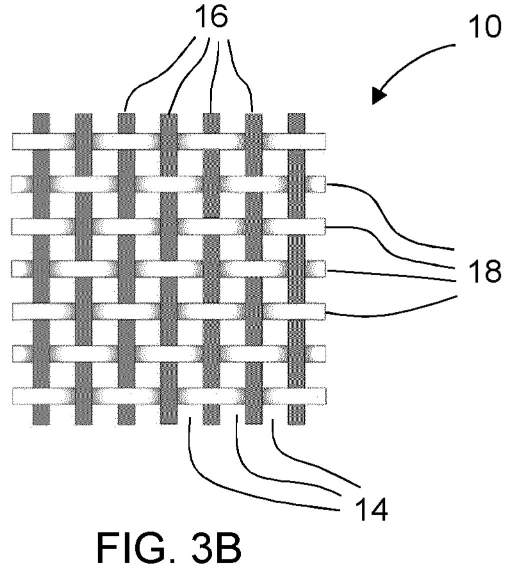
FIG. 3B is a schematic illustration of another arrangement of the filaments of the heating element of FIG. 2.

FIG. 2 shows a schematic plan view of another example heating element 10. The heating element 10 comprises an interwoven mesh 12 comprising a plurality of first filaments and a plurality of second filaments having interstices or apertures 14 therein. FIGS. 3A and 3B shows different arrangements of the pluralities of first and second filaments of the heating element 10. Each of FIGS. 3A and 3B show only part of the heating element 10 which has been enlarged for clarity. Similar to the heating element 1 of FIG. 1, the plurality of first filaments are made from electrically conductive stainless steel wire and are configured to heat a liquid aerosol-forming substrate (not shown). The plurality of second filaments 14*b* are made from hydrophilic glass fibre threads and are configured to convey a liquid aerosol-forming substrate to wet at least a portion of the heating element 1 with liquid aerosol-forming substrate.

In the arrangement of FIG. 3A, the plurality of first filaments 16*a*, 16*b*, that is, the heating filaments, are arranged in a mesh configuration. Half of the plurality of first filaments 16*a* are arranged in a first direction of the interwoven mesh and the other half of the plurality of first filaments 16*b* are arranged in a second direction of the interwoven mesh which is substantially orthogonal to the first direction. The apertures 14 are arranged between, and are bounded by, the plurality of first filaments 16*a*, 16*b*.

In the arrangement of FIG. 3A, the plurality of second filaments 18*a*, 18*b*, that is, the wicking filaments, are arranged between the plurality of first filaments 16*a*, 16*b* in both the first and second directions such that each space between neighbouring ones of the plurality of first filaments 16*a*, 16*b* contains a second filament 18*a*, 18*b*. In other words, the interwoven mesh heating element of FIG. 3A contains alternating first 16*a* and second 18*a* filaments in the first direction and alternating first 16*b* and second 18*b* filaments in the second direction. The first and second directions are substantially orthogonal to one another. The plurality of second filaments 18*a*, 18*b* intersect in the apertures 14 between the plurality of first filaments 16*a*, 16*b* and occupy at least a portion of the area of each of the apertures 14. In this arrangement, the plurality of second filaments 18*a*, 18*b* help to convey or draw liquid aerosol-forming substrate into the interstices or apertures 14 between the plurality of first filaments 16*a*, 16*b* and along the plurality of first filaments 16*a*, 16*b*, which in turn helps to wet the heating element 10.

In the arrangement of FIG. 3B, the heating element 10 is arranged in a mesh configuration. The plurality of first filaments 16, that is, the heating filaments, are arranged in a first direction and the plurality of second filaments 18, that is, the wicking filaments, are arranged in a second direction. The second direction is substantially orthogonal to the first direction. In this arrangement, the plurality of second filaments 18 help to convey or draw liquid aerosol-forming substrate into the spaces 14 between the plurality of first filaments 16 which helps to wet the heating element 10.

It should be noted that FIGS. 1, 2, 3A and 3B are schematic and are not to scale. For clarity, the figures have been simplified and the size of their features altered. For example, the filaments have been enlarged and their aspect ratio changed. In addition, fewer filaments are shown than would be present in an actual heating element.

Figure 4:
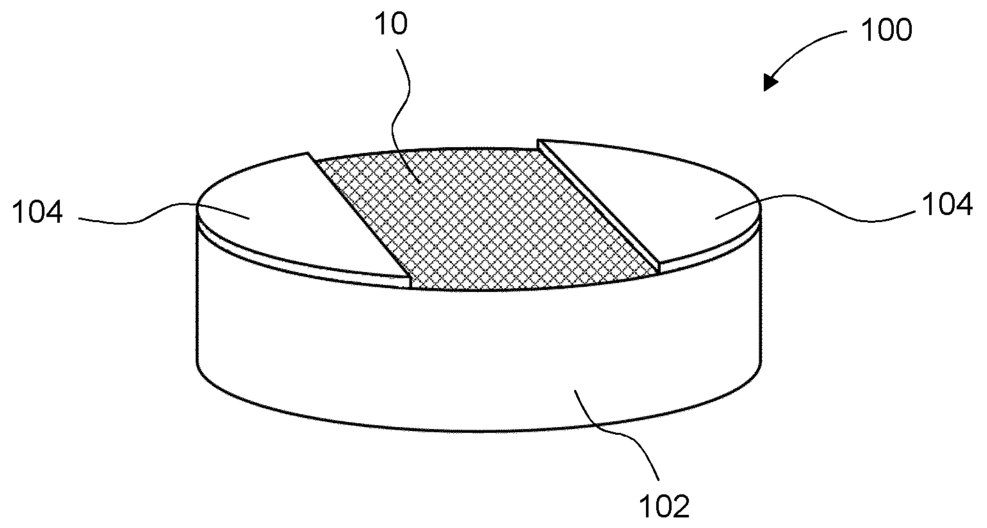
FIG. 4 is a perspective view of a heater assembly in accordance with an example of the present disclosure.

FIG. 4 is a perspective view of a heater assembly 100 comprising the mesh heating element 10 of FIG. 2 and a transport material 102. The mesh heating element 10 may have the filament arrangement of either FIG. 3A or 3B described above. The transport material is made from porous ceramic. Any suitable ceramic may be used for the transport material. The heating element 10 is fixedly attached to an upper surface of the transport material 102. Any suitable method of fixation can be used to attach the heating element 10 to the transport material.

The transport material 102 is arranged to convey a liquid aerosol-forming substrate (not shown) to the mesh heating element 10. As described above in respect of FIG. 2, a plurality of interstices or apertures are defined between the filaments of the mesh heating element 10. During heating, vaporised aerosol-forming substrate can be released from the heater assembly 100 via the apertures to generate an aerosol.

The heater assembly 100 further comprises a pair of electrical contacts 104 for supplying electrical power to the mesh heating element 10. The electrical contacts 104 comprise a pair of tin pads which are bonded directly to the mesh heating element 10 and are arranged on opposing sides of the mesh. Whilst the electrical contacts cover a portion of the mesh heating element 10, a sufficient area of the mesh heating element 10 remains and this does not affect aerosol generation.

Figure 5:
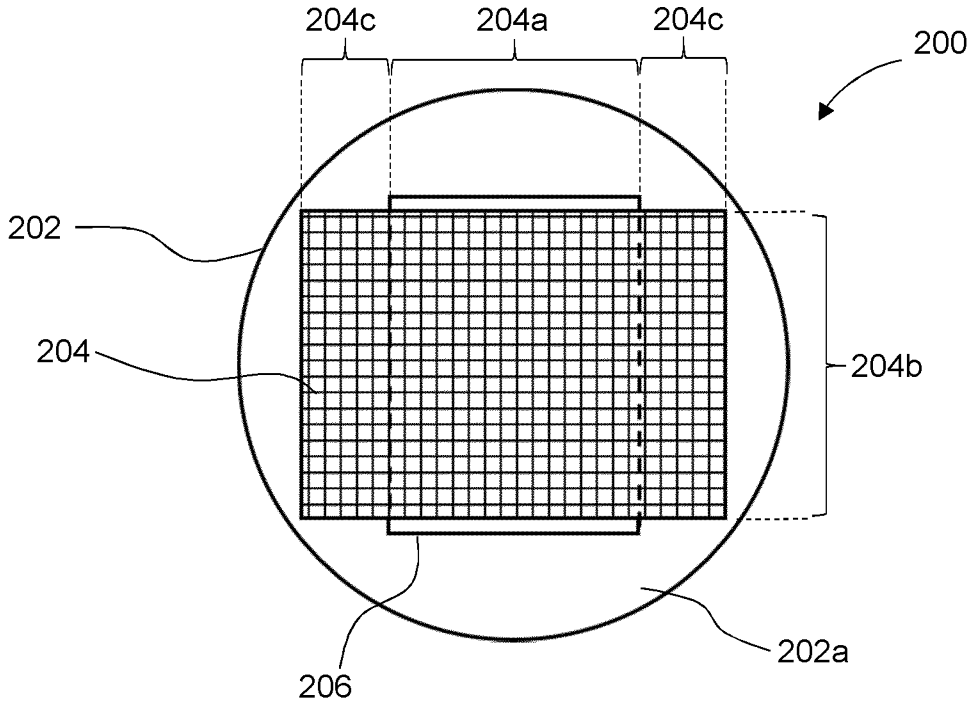
FIG. 5 is a plan view of a heater assembly in accordance with another example of the present disclosure.

FIG. 5 is a plan view of another example heater assembly 200 comprising a heater mount 202 and an interwoven mesh heating element 204. A rectangular opening 206 is formed in an upper end 202*a* of the heater mount 202 and passes through the upper end 202*a* of the heater mount 202 into an internal compartment (not shown) which comprises a liquid aerosol-forming substrate (not shown). Liquid aerosol-forming substrate is able to pass through the rectangular opening 206 to the mesh heating element 204. A transport material (not shown) may be arranged in the rectangular opening 206 in contact with the mesh heating element 204 to convey liquid aerosol-forming substrate to the mesh heating element 204. The mesh heating element 204 extends across the rectangular opening 206 and is fixedly attached to the upper surface 202*a* of the heater mount 202 on opposing sides of the heater mount 202. Any suitable method of fixation can be used to attach the heating element 204 to the heater mount 202. The heater mount 202 is made from PEEK.

The heater mount 202 is configured to be received with an induction coil (not shown) of an aerosol-generating device (not shown) so that the mesh heating element 204 can be inductively heated. The mesh heating element 204 comprises a plurality of first filaments 204*a* which are made from magnetic stainless steel wire such as AISI 430. The plurality of first filaments 204*a* are configured to be inductively heated to heat a liquid aerosol-forming substrate. The plurality of first filaments 204*a* are arranged in a first direction of the interwoven mesh heating element 204, which first direction is aligned with the direction of the applied varying magnetic field provided by the induction coil. The mesh heating element 204 also comprises a plurality of second filaments 204*b* which are made from glass fibre threads. The plurality of second filaments 204*b* are configured to convey a liquid aerosol-forming substrate to wet at least a portion of the mesh heating element 204 with liquid aerosol-forming substrate. The plurality of second filaments 204*b* are arranged in a second direction of the interwoven mesh heating element 204. The second direction is substantially orthogonal to the first direction. The mesh heating element 204 further comprises two pluralities of third filaments 204*c* which are made from non-magnetic stainless steel wire such as AISI 304. The pluralities of third filaments 204*c* are configured not to be inductively heated. The pluralities of third filaments 204*c* are also arranged in a first direction of the interwoven mesh heating element 204 and are located on either side of the region of the mesh heating element 204 formed by the plurality of first filaments 204*a*.

The mesh heating element 204 is fixedly attached to the heater mount in the regions of the mesh heating element 204 formed by the pluralities of third filaments 204*c*. The pluralities of third filaments 204*c* made from non-magnetic stainless steel wire are not heated by the induction coil of the aerosol-generating device and therefore significant heating of the regions of the mesh heating element 204 formed by the pluralities of third filaments 204*c* is avoided. This helps to reduce heating and thermal stress in the areas where the mesh heating element 204 is fixedly attached to the heater mount 202, which in turn helps to reduce damage to the heater mount 202 caused by heating of the mesh heating element 204.

Figure 6A:
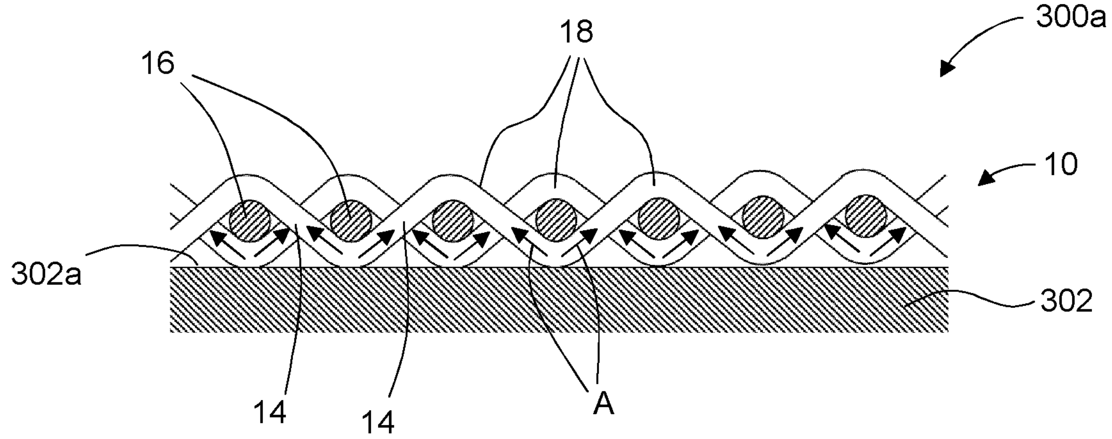
FIG. 6A is an enlarged cross-sectional view through part of a heater assembly in accordance with an example of the present disclosure.

FIG. 6A shows an enlarged cross-sectional view through part of an example heater assembly 300*a* comprising the mesh heating element 10 of FIG. 2 and a transport material 302. The mesh heating element 10 has the filament arrangement of FIG. 3B described above. That is, the mesh heating element 10 comprises a plurality of first or heating filaments 16 arranged in a first (warp) direction and a plurality of second or wicking filaments 18 arranged in a second (weft) direction, which is substantially orthogonal to the first direction. However, the filament arrangement of FIG. 3B or any other suitable filament arrangement could be used. The transport material is made from a porous ceramic. Any suitable ceramic may be used for the transport material. The heating element 10 is fixedly attached to an upper surface 302*a* of the transport material 302. Any suitable method of fixation can be used to attach the heating element 10 to the transport material 302.

The plurality of second filaments 18 convey or wick liquid aerosol-forming substrate from the transport material 302 into the spaces 14 between the plurality of first filaments 16 of the mesh heating element 10 as denoted by arrows A in FIG. 6A. This assists in wetting the mesh heating element 10 and improves the contact between the plurality of first filaments 16 and the transport material 302, which improves the transfer of liquid aerosol-forming substrate from the transport material 302 to the plurality of first filaments 16. The plurality of first filaments 16 heat and vaporise the liquid aerosol-forming substrate and vaporised aerosol-forming substrate escapes from the heater assembly 300*a* via the spaces 14 in the mesh heating element 10. The mesh heating element 10 is consistently wetted between uses, which assists in the production of an improved and more consistent aerosol.

Figure 6B:
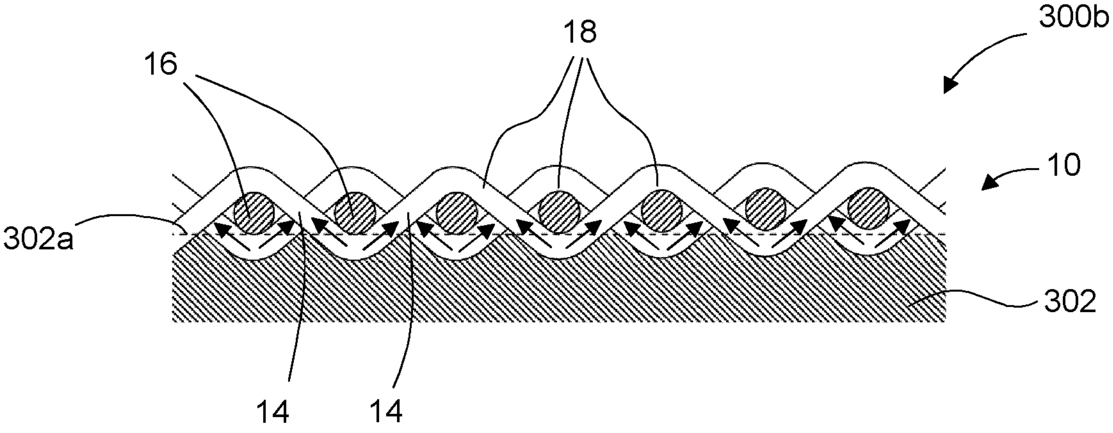
FIG. 6B is an enlarged cross-sectional view through part of a heater assembly in accordance with another example of the present disclosure.

FIG. 6B shows an enlarged cross-sectional view through part of another example heater assembly 300*b*. The arrangement of FIG. 6B is the same as that of FIG. 6A with the exception that the mesh heating element 10 has been integrated or embedded into the ceramic transport material 302 such that the upper surface 302*a* of the transport material 302 now contacts the plurality of first filaments 16, that is, the heating filaments. The portions of the plurality of second filaments 18, that is, the wicking filaments, which are below the plurality of first filaments 16 are embedded within the ceramic. The undulating shape of the plurality of second filaments 18 helps to achieve integration of the mesh heating element 10 with the transport material because it provides portions which can be embedded in the ceramic. The portions of the plurality of second filaments 18 below the plurality of first filaments 16 may be embedded in the pores of the porous ceramic transport material or the transport material may be formed with grooves or depressions for receiving portions of the plurality of second filaments 16. Alternatively, the transport material may be directly deposited on the underside of the mesh heating element 10 by some form of physical, vapour or electro deposition process.

Figure 7:
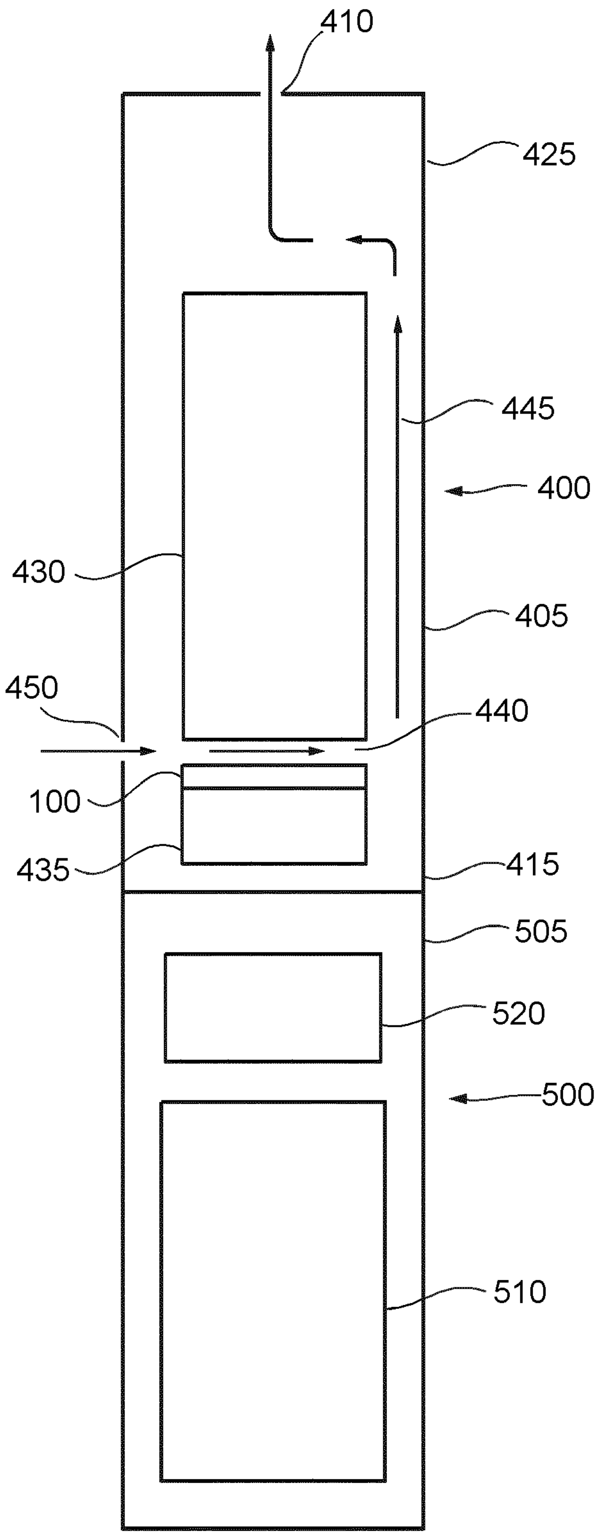
FIG. 7 is a schematic illustration of an example aerosol-generating system comprising a cartridge and an aerosol-generating device according to an example of the present disclosure.

FIG. 7 is a schematic illustration of an example aerosol-generating system. The aerosol-generating system comprises two main components, a cartridge 400 and a main body part or aerosol-generating device 500. A connection end 415 of the cartridge 400 is removably connected to a corresponding connection end 505 of the aerosol-generating device 500. The connection end 415 of the cartridge 400 and connection end 505 of the aerosol-generating device 500 each have electrical contacts or connections (not shown) which are arranged to cooperate to provide an electrical connection between the cartridge 400 and the aerosol-generating device 500. The aerosol-generating device 500 contains a power source in the form of a battery 510, which in this example is a rechargeable lithium ion battery, and control circuitry 520. The aerosol-generating system is portable and has a size comparable to a conventional cigar or cigarette. A mouthpiece 425 is arranged at the end of the cartridge 400 opposite the connection end 415.

The cartridge 400 comprises a housing 405 containing the heater assembly 100 of FIG. 4 and a liquid storage compartment or portion having a first storage portion 430 and a second storage portion 435. A liquid aerosol-forming substrate is held in the liquid storage compartment. Although not illustrated in FIG. 7, the first storage portion 430 of the liquid storage compartment is connected to the second storage portion 435 of the liquid storage compartment so that liquid in the first storage portion 430 can pass to the second storage portion 435. The heater assembly 100 receives liquid from the second storage portion 435 of the liquid storage compartment. At least a portion of the ceramic transport material of heater assembly 100 extends into the second storage portion 435 of the liquid storage compartment to contact the liquid aerosol-forming substrate therein.

An air flow passage 440, 445 extends through the cartridge 400 from an air inlet 450 formed in a side of the housing 405 past the mesh heating element of the heater assembly 100 and from the heater assembly 100 to a mouthpiece opening 410 formed in the housing 405 at an end of the cartridge 400 opposite to the connection end 415.

The components of the cartridge 400 are arranged so that the first storage portion 430 of the liquid storage compartment is between the heater assembly 100 and the mouthpiece opening 410, and the second storage portion 435 of the liquid storage compartment is positioned on an opposite side of the heater assembly 100 to the mouthpiece opening 410. In other words, the heater assembly 100 lies between the two portions 430, 435 of the liquid storage compartment and receives liquid from the second storage portion 435. The first storage portion 430 of the liquid storage compartment is closer to the mouthpiece opening 410 than the second storage portion 435 of the liquid storage compartment. The air flow passage 440, 445 extends past the mesh heating element of the heater assembly 100 and between the first 430 and second 435 portions of the liquid storage compartment.

The aerosol-generating system is configured so that a user can puff or draw on the mouthpiece 425 of the cartridge to draw aerosol into their mouth through the mouthpiece opening 410. In operation, when a user puffs on the mouthpiece 425, air is drawn through the airflow passage 440, 445 from the air inlet 450, past the heater assembly 100, to the mouthpiece opening 410. The control circuitry 520 controls the supply of electrical power from the battery 510 to the cartridge 400 when the system is activated. This in turn controls the amount and properties of the vapour produced by the heater assembly 100. The control circuitry 520 may include an airflow sensor (not shown) and the control circuitry 520 may supply electrical power to the heater assembly 100 when user puffs are detected by the airflow sensor. This type of control arrangement is well established in aerosol-generating systems such as inhalers and e-cigarettes. When a user puffs on the mouthpiece opening 410 of the cartridge 400, the heater assembly 100 is activated and generates a vapour that is entrained in the air flow passing through the air flow passage 440. The vapour cools within the airflow in passage 445 to form an aerosol, which is then drawn into the user's mouth through the mouthpiece opening 410.

In operation, the mouthpiece opening 410 is typically the highest point of the system. The construction of the cartridge 400, and, in particular, the arrangement of the heater assembly 100 between first and second storage portions 430, 435 of the liquid storage compartment, is advantageous because it exploits gravity to ensure that the liquid substrate is delivered to the heater assembly 100 even as the liquid storage compartment is becoming empty, but prevents an oversupply of liquid to the heater assembly 100 which might lead to leakage of liquid into the air flow passage 440.

Figure 8A:
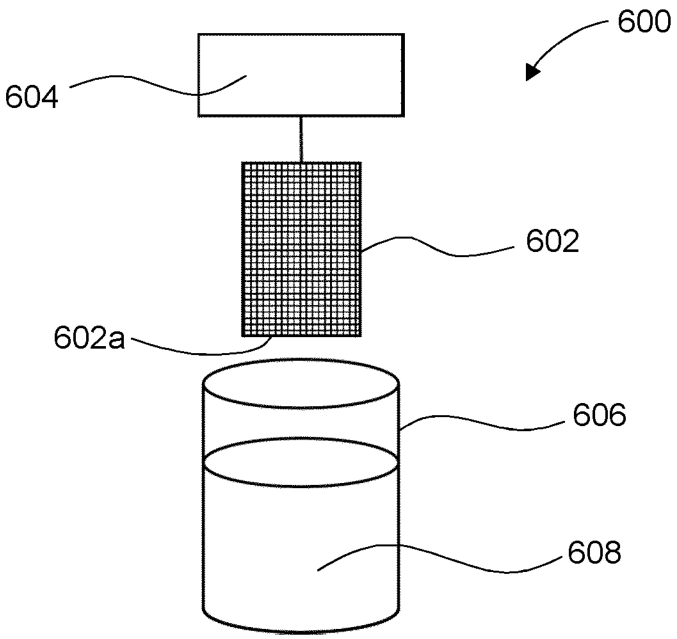
FIG. 8A is a schematic illustration of an apparatus used for measuring the wicking performance of a heating element.

FIG. 8A shows a schematic illustration of an apparatus 600 used for measuring the wicking performance of a mesh heating element 602. A 10 mm×5 mm rectangular sample of a mesh heating element 602 is prepared. The sample mesh heating element 602 is suspended vertically by one of its narrower edges from a weighing scale 604 that is capable of accurately measuring the weight of objects weighing as little as 0.0001 grams. The weighing scale may be connected to a computer (not shown) which logs measured weights over time. A container 606 containing an amount of liquid aerosol-forming substrate 608 underlies the sample mesh heating element 602. The mesh heating element 602 is lowered until the bottom horizontal narrow edge 602*a* of the sample mesh heating element 602 is in contact with the liquid aerosol-forming substrate 608 in the container 606. The amount of liquid absorbed by the mesh heating element 602 is then recorded against elapsed time from when wicking begins, that is, the time at which the sample mesh heating element 602 is brought into contact with the liquid aerosol-forming substrate. Liquid absorption by the sample mesh heating element 602 is due to vertical wetting of the heating element 602 with liquid aerosol-forming substrate.

Figure 8B:
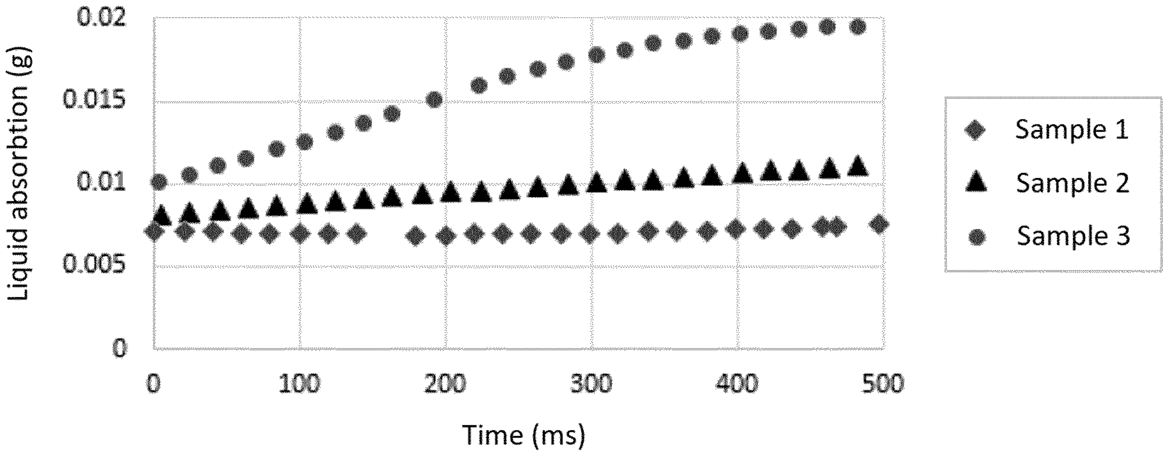
FIG. 8B is a graph showing the absorption of liquid aerosol-forming substrate versus time for three different heating element samples.

FIG. 8B shows a graph of liquid aerosol-forming substrate absorption in grams versus elapsed time in milliseconds for three different mesh heating element samples. The samples have the materials and dimensions shown in Table 1 below.

TABLE 1

| Sample | Materials and dimensions |
|---|---|
| Sample 1 | AISI 430 stainless steel wire, wire diameter 63 micron, mesh aperture size 80 micron |
| Sample 2 | AISI 312 stainless steel wire, wire diameter 25 micron, mesh aperture size 100 micron |
| Sample 3 | AISI 312 stainless steel wire, wire diameter 25 micron, mesh aperture size 100 micron, glass-fibre threads added in one direction of mesh (in FIG. 8A they are in the vertical direction), thread width is approximately equal to aperture size, that is, around 100 micron, thread thickness is approximately equal to wire diameter, that is, around 25 micron |

As can be seen from Table 1, Samples 1 and 2 are made from a single material. However, Sample 3 is a hybrid mesh and comprises both stainless steel wire as first filaments and glass-fibre threads as second filaments.

The graph of FIG. 8B shows the relative performance of Samples 1 to 3. As can be seen from the graph, the hybrid mesh of Sample 3 exhibits significantly improved performance compared to Samples 1 and 2 in terms of the rate of liquid absorption and the amount of liquid absorbed. Sample 3 has a higher rate of absorption of liquid aerosol-forming substrate compared to Samples 1 and 2. This means that the mesh heating element of Sample 3 will rewet more quickly following a previous puff than the other two samples. In addition, after 500 milliseconds, the amount of liquid absorbed by the hybrid mesh of Sample 3 is approximately two times higher than Sample 2, the nearest contender, suggesting that wicking and wetting performance is better in Sample 3 and that fast wicking and wetting is achieved. Therefore, it can be concluded from FIG. 8B that the provision of a hybrid mesh improves wicking and wetting performance. This will help to achieve more consistent aerosol generation between successive puffs and between aerosol-generating devices of the same type.

The invention claimed is:

1. A heating element for an aerosol-generating system, the heating element comprising:

a plurality of first filaments;

a plurality of second filaments, wherein the plurality of first filaments are configured to heat a liquid aerosol-forming substrate, wherein the plurality of second filaments are configured to convey the liquid aerosol-forming substrate to wet at least a portion of the heating element with the liquid aerosol-forming substrate, wherein the heating element is arranged to form a mesh, wherein the plurality of first filaments are arranged in a first direction and the plurality of second filaments are arranged in a second direction, and wherein the second direction is transverse to the first direction, and wherein the heating element is configured to be inductively heated, the plurality of first filaments being formed from a magnetic metallic material and the plurality of second filaments being formed from a non-metallic hydrophilic material; and a plurality of third filaments, which are formed from a non-magnetic metallic material such that the plurality of third filaments are not inductively heated to a significant degree when placed in a varying magnetic field, the plurality of third filaments being arranged in regions on either side of a region containing the plurality of first filaments.

2. The heating element according to claim 1, wherein the heating element further comprises an interwoven mesh.

3. A heater assembly for an aerosol-generating system, the heater assembly comprising a heating element according to claim 1 and a transport material configured to convey a liquid aerosol-forming substrate to the heating element.

4. The heater assembly according to claim 3, wherein portions of some of the plurality of second filaments are integrated into the transport material.

5. The heater assembly according to claim 3, further comprising at least two electrical contacts configured to supply electrical power to the heating element, wherein each of the electrical contacts is connected to at least one of the plurality of first filaments.

6. A cartridge for an aerosol-generating system, the cartridge comprising a heater assembly according to claim 3 and a liquid storage portion configured to hold a liquid aerosol-forming substrate.

7. An aerosol-generating system, comprising:

a cartridge according to claim 6; and an aerosol-generating device comprising a power supply configured to supply electrical power to the heating element, wherein the cartridge is configured to be removably coupled to the aerosol-generating device.

8. The heating element according to claim 1, wherein the plurality of third filaments form part of the heating element that is arranged to be connected to a heater mount.

9. The heating element according to claim 1, wherein the plurality of third filaments are formed from non-magnetic stainless steel.

10. A method of manufacturing a heating element for an aerosol-generating system, the heating element being configured to be inductively heated, the method comprising:

providing a plurality of first filaments configured to heat a liquid aerosol-forming substrate;

providing a plurality of second filaments configured to convey the liquid aerosol-forming substrate along at least a portion of their length to distribute the liquid aerosol-forming substrate across at least a portion of the heating element;

arranging the heating element to form a mesh, wherein the plurality of first filaments are arranged in a first direction and the plurality of second filaments are arranged in a second direction, the second direction being transverse to the first direction, wherein the plurality of first filaments are formed from a magnetic metallic material and the plurality of second filaments are formed from a non-metallic hydrophilic material; and arranging a plurality of third filaments in regions on either side of a region containing the plurality of first filaments, the plurality of third filaments being formed from a non-magnetic metallic material such that the plurality of third filaments are not inductively heated to a significant degree when placed in a varying magnetic field.

* * * * *